(12) United States Patent
Nungesser

(10) Patent No.: US 7,089,761 B2
(45) Date of Patent: Aug. 15, 2006

(54) EXPANSION VALVE WITH MOUNTING BRACKET

(75) Inventor: Roy J. Nungesser, Oviedo, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 222 days.

(21) Appl. No.: 10/831,589

(22) Filed: Apr. 23, 2004

(65) Prior Publication Data
US 2005/0235692 A1 Oct. 27, 2005

Related U.S. Application Data

(60) Provisional application No. 60/535,066, filed on Jan. 8, 2004.

(51) Int. Cl.
*F25B 41/06* (2006.01)
(52) U.S. Cl. ........................................ 62/527; 236/92 B
(58) Field of Classification Search .................. 62/225, 62/527; 236/92 B; 137/507; 285/137.11, 285/139.1, 420; 248/500
See application file for complete search history.

(56) References Cited

U.S. PATENT DOCUMENTS

| | | | |
|---|---|---|---|
| 3,537,645 A | | 11/1970 | Treder |
| 3,667,247 A | | 6/1972 | Proctor |
| 4,468,054 A | * | 8/1984 | Orth .................. 285/124.3 |
| 4,542,852 A | | 9/1985 | Orth et al. |
| 5,146,766 A | * | 9/1992 | Martins .................... 62/298 |
| 5,169,178 A | * | 12/1992 | Hunzinger .................... 285/26 |
| 5,269,459 A | * | 12/1993 | Thompson et al. ........ 236/92 B |
| 5,308,125 A | * | 5/1994 | Anderson, Jr. .............. 285/349 |

(Continued)

FOREIGN PATENT DOCUMENTS

JP    2000-233703 A  *  8/2000

(Continued)

OTHER PUBLICATIONS

An illustration, attached as Exhibit A, of a refrigeration valve and bracket where the bracket has a U-shaped opening on one side, and is supported against and riveted to an inner side surface of the fixed nut on the fitting. Applicant believes this assembly was publicly available and on sale more than one year prior to the filing date of the priority document and requests the U.S. Patent Office to consider it as such. Applicant reserves the right to further supplement this description should it be necessary or appropriate.

*Primary Examiner*—Mohammad M. Ali
(74) *Attorney, Agent, or Firm*—Christopher H. Hunter

(57) ABSTRACT

A bracket for a refrigeration valve includes an elongated flat plate bent in half with the two halves of the plate lying in parallel, adjacent relation. The inner bracket half includes an opening closely receiving the inlet fitting of the valve, and a predetermined internal geometry closely receiving the external profile of a fixed nut on the fitting. The outer bracket half also includes an opening configured to closely receive the fitting, and a dimension such that it butts up against an outer side surface of the nut. The outer bracket half is mechanically fixed to the fitting, such as by riveting, brazing or other means. Fasteners are received through corresponding apertures in the bracket halves to attach the bracket to a support surface. The cooperating geometries of the inner bracket half and the nut prevent the bracket from rotating with respect to the fitting during assembly.

23 Claims, 3 Drawing Sheets

U.S. PATENT DOCUMENTS 5,467,611 A * 11/1995 Cummings et al. ............ 62/299
5,555,739 A * 9/1996 Kujirai et al. ................. 62/244
5,556,138 A * 9/1996 Nakajima et al. ......... 285/124.4
5,724,817 A * 3/1998 Nishishita .................... 62/216
5,732,570 A * 3/1998 Tomatsu et al. .............. 62/527
6,189,333 B1 * 2/2001 Cummings et al. ........... 62/474
6,241,157 B1 * 6/2001 Yano et al. ................ 236/92 B
6,942,160 B1 * 9/2005 Kobayashi et al. ........ 236/92 B

FOREIGN PATENT DOCUMENTS

JP          2002-210032 A  *   7/2002

* cited by examiner

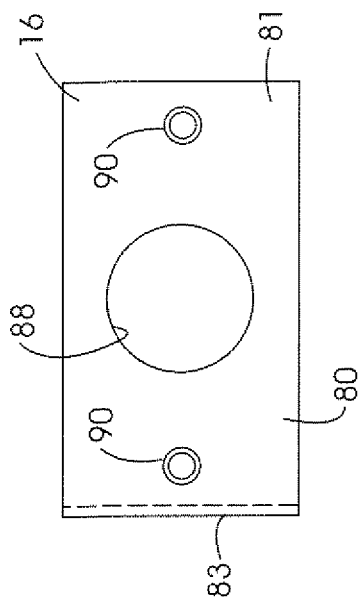
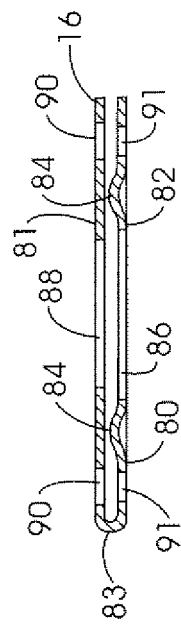
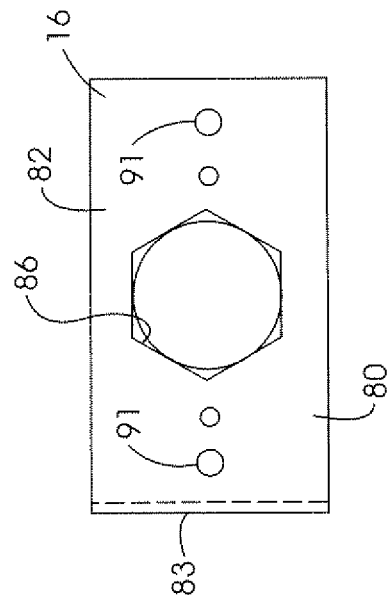
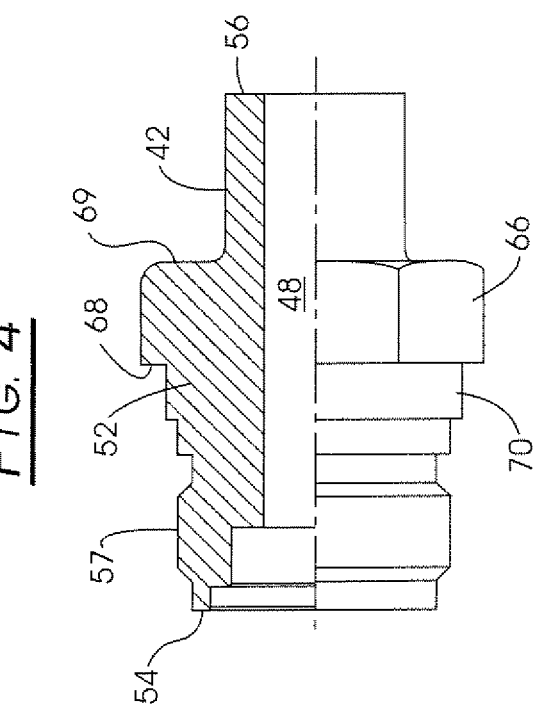
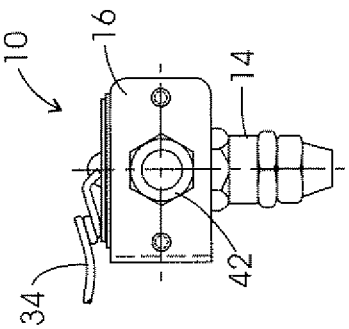

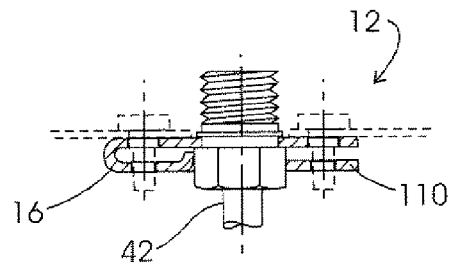
FIG. 9
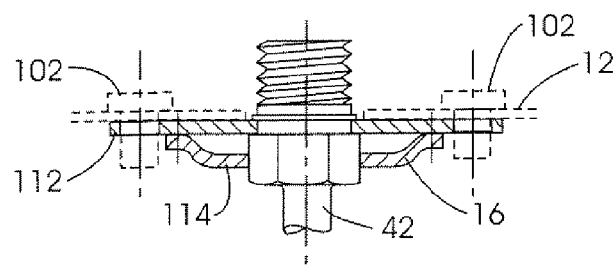
FIG. 10
FIG. 11
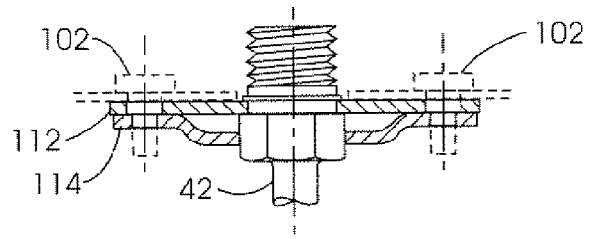
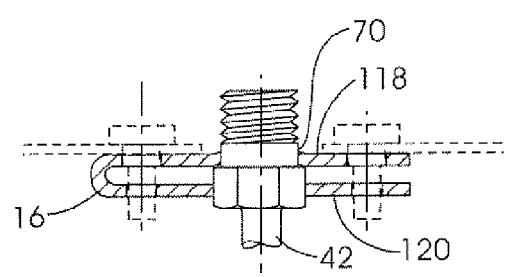
FIG. 12

EXPANSION VALVE WITH MOUNTING BRACKET

CROSS-REFERENCE TO RELATED CASES

The present application claims the benefit of the filing date of U.S. Provisional Application Ser. No. 60/535,066; filed Jan. 8, 2004, the disclosure of which is expressly incorporated herein by reference.

BACKGROUND OF THE INVENTION

A thermostatic expansion valve is used on many types of air conditioning and refrigeration systems, and controls refrigerant flow through the system to match compressor capacity. Thermostatic expansion valves typically include a power element comprising a diaphragm mounted between a domed head and a support cup on the valve body. A fluid "charge" is located within a head chamber defined by the domed head and one (upper) surface of the diaphragm. The support cup and the other (lower) surface of the diaphragm define a diaphragm chamber with the body of the expansion valve. A valve stem extends downwardly from the diaphragm through a bore in the valve body to a valve element modulating a valve orifice between i) an inlet fitting directing liquid refrigerant (from the condenser) at high pressure into the valve body, and ii) an outlet fitting directing the refrigerant from the valve body at low pressure to the evaporator. Proctor, U.S. Pat. No. 3,667,247; Treder, U.S. Pat. No. 3,537,645; and Orth, U.S. Pat. No. 4,542,852, for example, show such expansion valves.

To control the refrigerant flow, the diaphragm in the power element moves in response to the refrigerant condition exiting the evaporator and compensates the flow rate to the evaporator by opening or closing the valve orifice. One type of device used to communicate the refrigerant condition to the diaphragm is a feeler bulb. The feeler bulb is positioned in contact with a pipe carrying the refrigerant, and a tube extends from the feeler bulb to the diaphragm chamber such that the charge in the diaphragm chamber is at essentially the temperature of the refrigerant at the location of the bulb. Refrigerant pressure against the bottom of the diaphragm along with the force of an adjustment spring on the valve element tends to close the valve, while pressure from the charge tends to open the valve. A feeler bulb is of course only one example of a known device that senses the refrigerant condition and communicates the condition to the power element. Other devices and techniques are of course known to those in the industry.

In certain applications, it is desirable to support the expansion valve in relatively close proximity to the condenser/heat exchanger. The valve should be supported in a manner that is rigid enough to prevent damage or refrigerant leakage from the valve due to movement, vibration, etc. of the support location. Ease of installation and removal of the valve such as for inspection and repair, at the both the manufacturing and field locations, is also often desirable. It is known to use a bracket to support the refrigeration valve directly against the side panel of a cabinet or enclosure. In one application, a U-shaped notch is provided along the side of a bracket plate, and the plate is slid laterally onto the inlet fitting of the valve. The fitting includes a fixed nut, and the bracket is slid up against the inner side surface of the nut and fastened thereto such as with one or more rivets or by brazing. The fitting is then inserted through an opening in the cabinet, with the bracket located adjacent the outer surface of the cabinet. Bolts are received through apertures in the plate and corresponding apertures in the cabinet, and nuts are tightened down on the bolts to rigidly attach the valve to the cabinet.

After assembly of the valve on the cabinet, the valve is fluidly connected to the refrigeration system. The refrigerant line from the condenser, with its own fitting, is screwed on the inlet fitting. A backup wrench is used to hold the nut on the inlet fitting while the fitting of the refrigerant line is tightened. Care must be taken to prevent over-torquing of the inlet fitting, as the braze/rivet connection of the bracket to the inlet fitting can fail, which would disconnect the valve from the cabinet and render it unusable. Sliding a backup wrench around the hex nut on the inlet fitting can be difficult and awkward depending on the location of the valve and the space available in the cabinet. And, of course, this also requires keeping such a backup wrench handy for the installation and removal of the refrigerant valve.

It is therefore believed there is a demand in the industry for an improved refrigeration valve, and particularly for a refrigeration valve having an improved attachment technique to attach the valve to a cabinet or other support surface, which overcomes many of the above-described drawbacks, and which is robust, simple, and rapid.

SUMMARY OF THE INVENTION

The present invention provides a novel and unique refrigeration valve, and in particular a refrigeration valve having a unique attachment technique including a bracket, which is robust, simple and rapid, and provides for securely connecting the refrigeration valve to a support location, such as the side panel of a cabinet.

According to the present invention, the bracket for the refrigeration valve includes an elongated flat plate that is bent in half such that the two halves of the plate lie in parallel, adjacent relation to one another. A geometry, such as a series of raised nubs, can be provided in one (or both) of the bracket halves to keep the bracket halves in closely-spaced relation to one another. One bracket half, closest to the valve body, includes an opening configured to closely receive the inlet fitting of the valve, and has a predetermined internal (preferably hex) geometry closely receiving the external (typically hex) profile of the fixed nut on the fitting. The other bracket half, closest to the distal end of the inlet fitting, also includes an opening, co-axial with the opening in the first half, configured to closely receive the fitting, but has a dimension such that it butts up against an outer side surface of the nut when the bracket is fully slid onto the fitting. The spacing between the bracket halves keeps the inner bracket half located on the hex or profiled portion of the nut, when the outer bracket half is located against the outer side surface of the nut. The outer bracket half is then mechanically fixed to the fitting, such as by staking, coining or crimping a portion of the fitting against the outer surface of the bracket half, or by other means, such as riveting or brazing the outer bracket half to the nut, or by press-fit.

Each bracket half includes a pair of apertures, with each aperture aligned with an aperture in the adjacent bracket half. The inlet fitting is inserted through an opening in the cabinet or other support surface in a conventional manner, and bolts are received through the aperture pairs, to fix the bracket directly to the support surface. The inner bracket half can have threaded apertures, to enable the bolts to be tightened down directly into engagement with the bracket. Alternatively, separate nuts can be provided and tightened down on the bolts.

The cooperating geometries of the inner bracket half and the fitting nut prevent the bracket from rotating with respect to the fitting and valve during assembly. No backup wrench is necessary to hold the inlet fitting during attachment of the refrigerant line. Any rotational force on the inlet fitting caused by connection of the refrigerant line is applied directly to the nut-bracket interface, rather than a braze or weld connection, which prevents separation of the bracket from the fitting. This facilitates assembly of the valve, and reduces the number of tools necessary to attach or remove the valve. The inlet fitting can also be shorter, as there is no need to provide sufficient space for access by a back-up wrench. This allows the valve to be mounted closer to the cabinet, for a more compact system.

The refrigeration valve is otherwise conventional, and includes, for example, a body with a power element mounted between a domed head and a support cup, a charge in the head chamber, and a valve element modulating a flow path between an inlet fitting and an outlet fitting. Any type of sensing device, such as a feeler bulb, can be used to sense the refrigerant condition and communicate the condition to the power element for modulating the valve element.

The bracket of the present invention can also be used with other refrigeration components and valves other than a refrigeration valve, to provide a secure attachment between one component, and a support location using a bracket which prevents undesirable forces from detrimentally effecting the bracket/fitting attachment interface.

As such, the present invention provides a novel and unique refrigeration valve, and in particular a refrigeration valve having a unique attachment technique including a bracket, which is robust, simple and rapid, and provides for securely connecting the refrigeration valve to a support surface, such as the side surface of a cabinet.

Further features of the present invention will become apparent to those skilled in the art upon reviewing the following specification and attached drawings.

BRIEF DESCRIPTION OF THE DRAWINGS

FIG. 3 is a side view of the refrigeration valve assembly, rotated ninety degrees from the view in FIG. 1, and illustrating the bracket supported in a first orientation;

FIG. 4 is a side view, in partial cross-section, of the inlet fitting for the refrigeration valve;

FIG. 5 is a cross-sectional side view of the bracket for the refrigeration valve;

FIG. 6 is a plan view of the outer half of the bracket;

FIG. 7 is a plan view of the inner half of the bracket;

FIG. 9 is a side view, in cross-section, of the bracket/fitting interface constructed in accordance with a first alternative embodiment of the present invention;

FIG. 10 is a side view, in cross-section, of the bracket/fitting interface constructed in accordance with a second alternative embodiment of the present invention;

FIG. 11 is a side view, in cross-section, of the bracket/fitting interface constructed in accordance with a third alternative embodiment of the present invention; and FIG. 12 is a side view, in cross-section, of the bracket/fitting interface constructed in accordance with a fourth alternative embodiment of the present invention;

DETAILED DESCRIPTION OF THE PREFERRED EMBODIMENT

Figure 1:
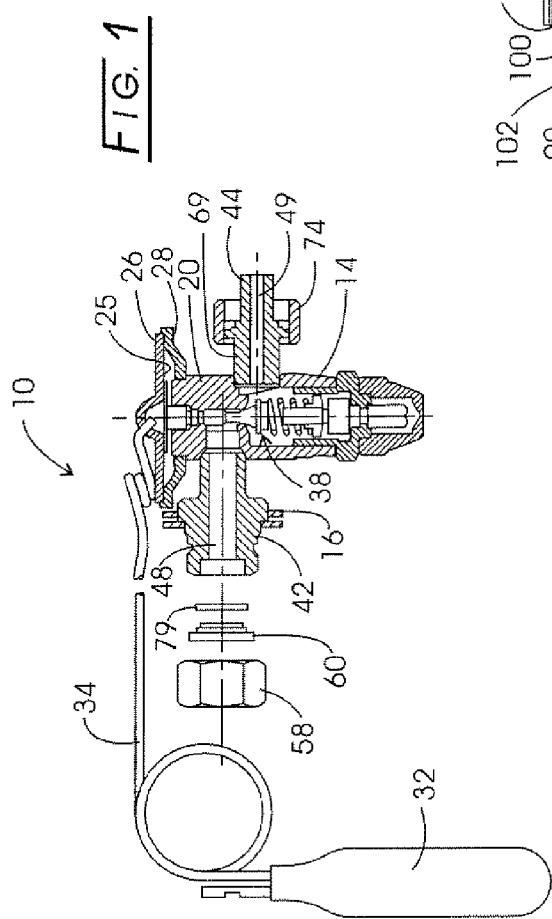
FIG. 1 is a side, partially-exploded view, with certain components in cross-section, of a refrigeration valve assembly constructed according to the principles of the present invention.
Figure 2:
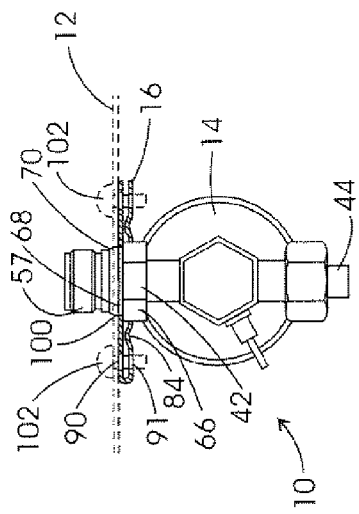
FIG. 2 is a top view, with certain components in cross-section, of the refrigeration valve assembly of FIG. 1, illustrated as being attached to a cabinet panel.

Referring to the drawings, and initially to FIGS. 1-3, a refrigeration valve assembly is indicated generally at 10, constructed in accordance with the principles of the present invention. The refrigeration valve assembly 10 is intended to be attached to a support surface, such as a cabinet panel 12, illustrated in FIG. 2, or other enclosure.

The refrigeration valve assembly 10 is illustrated as including a refrigeration valve 14, and a bracket 16. The valve 14 includes a body 20 with a power element 24 comprising a diaphragm member 25 mounted between a domed head 26 and a support cup 28. A feeler bulb 32 is connected via a tube or pressure carrier 34 to the domed head and contains a liquid charge. The feeler bulb is located typically along and in thermal contact with a tube carrying refrigerant from the evaporator to the suction side of the compressor, or other appropriate location in the refrigeration system, for sensing the refrigerant condition. A valve element as at 38 is supported for movement within the valve body, and is connected to the diaphragm member for modulating a flow path between an inlet fitting 42 and an outlet fitting 44. Inlet and outlet fittings 42, 44 are each connected at one end to the valve body in an appropriate manner, and each has a central passage 48, 49, respectively, for directing refrigerant into and out of the body. Inlet fitting 42 receives high-pressure liquid refrigerant from the condenser, while outlet fitting 44 directs saturated liquid/vapor refrigerant under lower pressure to the evaporator. As is well-known, the refrigerant changes phase as it passes through the refrigeration valve.

While a specific type of refrigeration valve is described above and illustrated, it should be apparent that the present invention is appropriate for practically any type of refrigeration valve; and even more generally, is appropriate for many types of valves and other fluid control devices and components where it is necessary or desirable to attach the device to a support surface, and then attach a fluid line to the device, while minimizing or preventing detrimental rotational, or other forces on the device, as will be described in more detail below.

Referring now to FIG. 4, the inlet fitting 42 includes a cylindrical body 52, extending from an outer, distal or free end 54 to an inner end 56, connected to the valve body 20. The outer distal end has an external threaded portion as at 57 for attachment to the liquid line from the condenser. As can be seen in FIG. 1, a nut 58 is received over the threaded portion at the end of the inlet fitting, and captures a seal 59 and adapter 60 against the outer end of the fitting. The line from the condenser (not shown) is received in the outer end of the nut, and has a ferrule or other device to create a fluid-tight seal with the inlet fitting.

The fitting body 52 has an external profile between the outer end 54 and the inner end 65. Preferably this profile is a nut as at 66, or other non-cylindrical geometry, integral with the fitting body 52, and preferably located at about the midpoint of the fitting. Nut 58 preferably has a hex geometry with adjacent flat surfaces, although it could also be square, octagon, etc. The nut 66 has a flat, outer annular side surface 68, facing the distal end 54, and a flat, inner annular side surface 69, facing the valve body. The fitting has a stepped outer geometry between the nut 66 and the distal end 54, with the step adjacent the outer side surface 68 of the nut creating an annular, radially-outward facing land 70.

Referring again to FIG. 1, the outlet fitting 44 has a conventional design, and typically includes a cylindrical body 69, and an outer, rotatable nut 74, retained on the end of the body 69 in a conventional manner.

While the invention is described as having the bracket 16 applied to the inlet fitting 42, it is possible in certain applications that the bracket could alternatively be applied to the outlet fitting 44, which would then preferably have substantially the same structure described above with respect to the inlet fitting.

Referring now to FIGS. 5 . 7, the bracket 16 for the refrigeration valve includes an elongated flat plate 80 that is bent in half such that the two flat halves or portions 81, 82, of the plate lie in parallel, adjacent relation to one another, and are integrally (unitarily) connected together along a common edge 83. A geometry, such as a series of raised nubs at 84, formed by stamping or other feature, can be provided in one (or both) of the bracket halves to keep the bracket halves in closely-spaced relation to one another. The inner bracket half 82, closest to the valve body, includes an opening 86 configured to closely receive the inlet fitting of the valve, and has a predetermined internal (preferably hex) geometry closely receiving the external (typically hex) profile of the fixed nut 66 on the fitting. Opening is 86 preferably formed in a conventional manner, such as by stamping.

The outer bracket half 81, closest to the distal end of the inlet fitting, also includes an opening 88, preferably with a circular geometry co-axial with opening 86, and configured to receive the fitting, but with a dimension such that it is closely received over the land 70, and butts up (is flush) against the outer side surface 68 of the nut. The spacing between the bracket halves caused by nubs 84 keeps the inner bracket half 82 located on the hex or profiled portion of the nut, when the outer bracket half 81 is against the outer side surface of the nut (see, e.g., FIGS. 1, 3).

Figure 8:
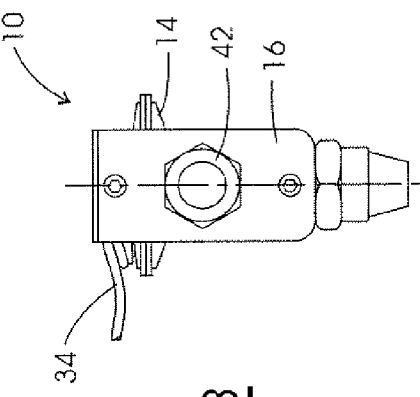
FIG. 8 is a side view of the refrigeration valve assembly of the present invention, illustrating the bracket supported in a second orientation.

The outer bracket half 81 is then mechanically fixed to the fitting, such as by staking (such as at 100), coining or crimping a portion of the fitting against the outer surface of the bracket half, or by other means, such as riveting or brazing the outer bracket half to the nut. The bracket 16 can be fixed to the valve in either a horizontal (FIG. 3) or vertical (FIG. 8) orientation (or at some angle in-between), depending on the requirements of the application.

Each bracket half 81, 82 includes a pair of apertures 90, 91, respectively, with each aperture aligned with an aperture in the adjacent bracket half (see, e.g., FIG. 5). The apertures are preferably outwardly-spaced from nubs 84, that is, the nubs (or other feature) are intermediate the apertures 90, 91 and the central openings 86, 88. After the bracket is fixed to the valve, the inlet fitting is inserted through an opening 100 in the cabinet or other support surface, and fasteners such as bolts 102 are received through the aperture pairs 90, 91, to support and fix the bracket 16 directly against the surface. The aperture 91 of inner bracket half 82 can be threaded, to enable the bolts 102 to be tightened down directly into engagement with the bracket. Alternatively, separate nuts (not shown) can be provided and tightened down on the ends of the bolts. Again, the nubs 84 provide a set clearance between the plate halves, so that the plate halves remain located over the appropriate locations on the fitting, even when the fasteners are fully torqued-down. The location of the nubs 84 between the central openings 86, 88 and the apertures 90, 91 prevents deformation of the plate halves caused by over-torquing of the fasteners from effecting the spacing of the plates on the fitting. While nubs 84 are shown as being integral (unitary) with the over bracket half 81, it again should be appreciated that the nubs could be formed in inner bracket half 82, or in both bracket halves; or that the spacing between the plates could be accomplished by other features or means, such as separate spacer members.

The cooperating geometries of the opening 86 in the inner bracket half 82, and the fitting nut 66 prevent the bracket 16 from rotating with respect to the fitting 42 and valve 14 during connection of a liquid line. The assembler grips nut 58 from the liquid line, and rotates this nut to screw the nut onto the inlet fitting of the valve. The valve remains stationary, as the fasteners rigidly fix the bracket 16, and hence the fitting and valve, to the cabinet panel or other support surface. The mechanical interengaging of the bracket and fitting transfers the torque directly to the panel, rather than through bracket/fitting braze or rivet interface, as with prior designs. The geometries of the opening 86 in the inner plate and the profile of the nut are preferably the same, although as should be appreciated, they could be different (e.g., hex and square; octagonal and hex; etc.) and still interengage to prevent rotation of the bracket during assembly. No backup wrench is necessary to hold the fitting during attachment of a liquid line. This facilitates assembly of the valve, and reduces the number of tools necessary to attach or remove the valve. The inlet fitting can also be shorter, as there is no need to provide sufficient space for access by a back-up wrench. This allows the valve to be mounted closer to the cabinet, for a more compact system.

Certain alternatives are illustrated in FIGS. 9–12. FIG. 9, for example, shows bracket 16 having an inner bracket half 110 which is extruded into an appropriate configuration for engaging the profile on nut 66. FIGS. 10 and 11 illustrate a bracket 16 having two separate bracket halves 112, 114, rather than the unitary construction described above. The bracket halves 112, 114 can be attached together such as by rivets, welding or metal deformation, with one of the bracket halves having apertures for receiving fasteners for fixing the bracket to the support surface (FIG. 10); or the fasteners could extend through apertures in both bracket halves and be used for also fixing the bracket halves together (FIG. 11), although additional riveting, welding, etc. of the bracket halves could also be utilized. Finally, FIG. 12 shows a bracket where the outer bracket half 118 is press-fit to the land 70 of the inlet fitting, rather than using mechanical staking, riveting, etc. described previously, to fix the bracket to the fitting. The inner bracket half 120 could likewise be press-fit to the nut profile, rather than closely fit.

As such, the present invention provides a novel and unique refrigeration valve, and in particular a refrigeration valve having a unique attachment technique including a bracket, which is robust and simple, and provides for securely connecting the refrigeration valve to a support surface, such as the side surface of a cabinet.

What is claimed is:

1. A refrigeration valve assembly for a refrigeration system, the refrigeration valve assembly including a refrigeration valve having a valve body and a fitting, the fitting including a first end connected to the valve body, a second, distal end with a threaded portion, and a geometry with an external profile intermediate the first and second ends; and a bracket fixed to the fitting for attaching the refrigeration valve to a support location, the bracket including i) a first plate portion having a first opening configured to receive the fitting, the first opening having a predetermined internal geometry receiving the external profile and cooperating with the external profile to prevent relative rotation of the bracket with respect to the fitting, ii) a second plate portion having a second opening also configured to receive the fitting, the second opening having a dimension cooperating with the geometry to locate the bracket axially along the fitting, and iii) attachment means for attaching the bracket to the support location.

2. The refrigeration valve assembly as in claim 1, wherein the first and second plate portions are located in adjacent, parallel relation to each other.

3. The refrigeration valve assembly as in claim 2, wherein the geometry includes an annular side surface facing the distal end of the fitting, with the second plate portion abutting the surface.

4. The refrigeration valve assembly as in claim 3, wherein one of the plates includes a geometry which spaces the first plate portion from the second plate portion.

5. The refrigeration valve assembly as in claim 4, wherein the plate geometry includes a raised nub on one of the plates interposed between the first plate portion and second plate portion.

6. The refrigeration valve assembly as in claim 1, wherein the plate portions are connected together along a common edge.

7. The refrigeration valve assembly as in claim 6, wherein the plate portions are unitary, and bent together into overlying relation along the common edge.

8. The refrigeration valve assembly as in claim 1, wherein the external profile on the fitting is a hex profile.

9. The refrigeration valve assembly as in claim 8, wherein the internal geometry of the first opening is a hex geometry.

10. The refrigeration valve assembly as in claim 1, wherein the fitting is mechanically fixed to the bracket, to prevent the bracket from being removed from the fitting.

11. The refrigeration valve assembly as in claim 10, wherein the fitting is fixed to the bracket by staking or press-fit.

12. The refrigeration valve assembly as in claim 1, wherein the attachment means comprises one or more apertures in the bracket, and fasteners received in the aperture.

13. The refrigeration valve assembly as in claim 12, wherein each plate portion includes at least one aperture, with the apertures in the adjacent plates being cooperatively aligned such that the fasteners can be inserted through the openings.

14. The refrigeration valve assembly as in claim 13, wherein the apertures are threaded, and the fasteners comprise threaded bolts, each of which cooperates with a threaded aperture in the bracket to fix the bracket to the support surface.

15. The refrigeration assembly as in claim 12, wherein one of the plates includes a geometry between an aperture and the respective first or second opening which spaces the plate portions apart.

16. The refrigeration valve assembly as in claim 1, wherein both plate portions are flat.

17. A refrigeration valve assembly, the refrigeration valve assembly including a refrigeration valve having a valve body and a fitting, the fitting including a first end connected to the valve body, a second, distal end, and a nut with an external profile intermediate the first and second ends; and a bracket fixed to the fitting for attaching the refrigerant valve to a support surface, the bracket including i) a first plate portion having a first opening configured to receive the fitting, the first opening having a predetermined internal geometry closely receiving the external profile of the nut and cooperating with the nut to prevent relative rotation of the bracket with respect to the fitting, ii) a second plate adjacent the first plate and having a second opening, co-axial with the first opening, also configured to receive the fitting, the second opening having a dimension such that the second plate abuts a side surface of the nut, and iii) apertures in at least one bracket plate and fasteners received in the apertures for attaching the bracket to the support surface.

18. The refrigeration valve assembly as in claim 17, wherein the plate portions are connected together along a common edge.

19. The refrigeration valve assembly as in claim 17, wherein the plate portions are unitary, and bent together into overlying relation along a common edge.

20. The refrigeration valve assembly as in claim 17, wherein the bracket includes a feature for spacing one plate portion from the other.

21. The refrigeration valve assembly as in claim 20, wherein the feature includes a raised nub on one of the plates.

22. The refrigeration valve assembly as in claim 17, further including means for fixing the bracket to the fitting.

23. A fluid control device, comprising a fitting, the fitting including a first end, a second, distal end, and a nut with an external profile intermediate the first and second ends; and a bracket fixed to the fitting for attaching the device to a support location, the bracket including i) a first plate portion having a first opening configured to receive the fitting, the first opening having a predetermined internal geometry closely receiving the external profile of the nut and cooperating with the nut to prevent relative rotation of the bracket with respect to the fitting, ii) a second plate portion adjacent the first plate and having a second opening, co-axial with the first opening, also configured to receive the fitting, the second opening having a dimension such that the second plate abuts a side surface of the nut, and iii) attachment apertures for attaching the bracket to the support location.

* * * * *